United States Patent Office 3,177,240
Patented Apr. 6, 1965

3,177,240
BORON TROPOLONE CHELATES
Earl L. Muetterties, West Chester, Pa., assignor to E. I. du Pont de Nemours and Company, Wilmington, Del., a corporation of Delaware
No Drawing. Filed July 1, 1963, Ser. No. 292,077
11 Claims. (Cl. 260—462)

This invention relates to certain new boron chelates and to a process for their preparation.

Tropolone (i.e., 2-hydroxy-2,4,6-cycloheptatriene-1-one) and substituted tropolones are known to form chelates with a number of metals. All of the known tropolone chelates are neutral (non-ionic) in character, with the exception of the zinc, nickel and cobalt chelates of certain tropolones. As reported by Bryant et al. [J. Am. Chem. Soc. 75, 3784 (1955)], these three divalent metals are able to form complexes in which three tropolone molecules combine with the metal atom, so that these complexes bear a negative charge. No ionic tropolone chelates where the metal complex is the cation have been reported.

It has now been found that the tropolones are capable of forming with boron positively charged chelates which are isolated as salts characterized by solubility in water and resistance to hydrolysis under neutral or acidic conditions.

The new products of this invention are complexes of the general formula

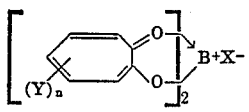

where X is an acid-forming anion; Y is a nuclear substituent such as an aliphatically saturated hydrocarbon radical of 1 to 10 carbon atoms, a lower alkoxy radical, halo, hydroxymethyl, hydroxy or nitro; and n is a whole number from 0 to 3, inclusive.

These compounds are prepared by a one- or two-step process which comprises (a) Bringing in contact in an aprotic organic solvent a boron trihalide B(Hal.)$_3$ where Hal. stands for chlorine or bromine with a tropolone, whereby there is spontaneous formation of an ionic chelate in which the anion is Cl$^-$ or Br$^-$, as the case may be, according to the equation

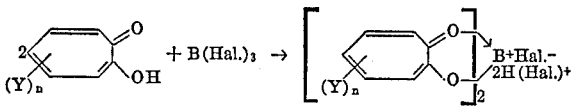

where Y and n have the previously stated significance; and, (b) If a different cheleate salt is desired, bringing in contact in aqueous solution the above chloride or bromide chelate with a salt of a strong base and an acid whose anion is other than chloride or bromide, whereby metathesis occurs to give a chelate of the same structure but where the chloride or bromide anion is replaced by the new anion.

In the first step of this process, there can be used as the ligand-forming reactant any tropolone corresponding to the formula shown in the above equation, numerous examples of which have been described in the literature. Any substituent present on the tropolone nucleus should obviously be one that is not appreciably reactive with the boron trihalide. Thus, the nuclear substituent Y can be an aliphatically saturated hydrocarbon radical of 1 to 10 carbon atoms, for example, alkyl such as methyl, ethyl, isopropyl, n-butyl, tert.-butyl, n-octyl, n-decyl; cycloalkyl such as cyclohexyl; aryl such as phenyl, naphthyl; aralkyl such as benzyl, phenylethyl; alkaryl such as tolyl, xylyl; lower alkoxy such as methoxy, ethoxy, butoxy; halo such as chloro, bromo, iodo; or it can be the hydroxymethyl, hydroxy, or nitro radicals. As many as three such nuclear substituents can be present. The preferred starting material, solely for reasons of accessibility and cost, is tropolone itself.

The relative proportions of the tropolone and boron trihalide are not critical, since a complex containing two ligand molecules per boron atom forms regardless of the initial reactant ratio. However, for more complete utilization of the reactants and easier recovery of the reaction products, it is preferred to use approximately two moles of the tropolone per mole of boron trichloride or tribromide.

In view of the sensitivity of the boron trihalides to water, hydroxylated compounds or protonic compounds in general, the chelate-forming reaction is conducted in an aprotic liquid medium which dissolves the reactants to at least some extent, e.g., 5% by weight. An aprotic solvent, as defined in Remick's "Electronic Interpretations of Organic Chemistry" (1943), pages 456–457, is one which neither gives up nor takes up protons to an appreciable degree. The suitable solvents may also be defined as those in which any hydrogen atoms present are bound solely to carbon atoms. Preferred solvents include aromatic hydrocarbons or halohydrocarbons, such as benzene, toluene, the xylenes, chlorobenzene; aliphatic halohydrocarbons such as methylene chloride, chloroform, trichloroethylene, tetrachloroethylene, sym.-tetrachlorodifluoroethane; nitriles such as acetonitrile; ethers such as di-n-butyl ether, dioxane, tetrahydrofuran; etc. An acid acceptor to neutralize the hydrogen halide formed, such as a tertiary amine, e.g., pyridine, triethylamine, may be present but this is by no means essential.

The chelate-forming reaction is spontaneous and exothermic. Thus, application of heat is not necessary, although mild heating to complete the reaction and expel the hydrogen halide can be used if desired. There is therefore no critical reaction temperature, and the external temperature may be, for example, in the range of −20° C. to 100° C.

The resulting ionic chelate often precipitates from the solution as it forms. If this does not take place, it can be isolated by evaporation of the solvent. These chelates are crystalline materials which may be purified, if necessary, by recrystallization from water or from mixtures of water and a miscible organic solvent such as methanol, ethanol, acetone or acetonitrile.

From these initially obtained chelate salts, in which the anion is Cl$^-$ or Br$^-$, other chelate salts containing any desired acid-forming anion can be prepared by simple metathesis in aqueous solution. By "acid-forming anion" is meant, of course, an anion which, when combined with protonic hydrogen, forms a compound which is acidic in the classical sense, that is, which has a pH below 7 in aqueous solution.

This metathetical reaction is most conveniently effected simply by bringing in contact in a preponderantly aqueous solution (water alone or mixtures of water with an ionizing water-soluble organic solvent such as a lower alkanol) the chelate obtained in the initial step of the process and at least an equimolar amount of a salt of a strong base (dissociation constant of at least 1×10$^{-5}$) and the acid whose anion is desired. The cation in this salt may be, for example, an alkali metal (preferably sodium or potassium), ammonium, or alkylammonium such as tetramethylammonium, tetraethylammonium, dimethylammonium, isopropylammonium, tributylammonium, etc. The nature of the anion is immaterial. It can be inorganic or organic, monovalent or polyvalent. Thus, for example, the anion may be iodide, fluoride, cyanide, nitrate, nitrite, sulfate, sulfite, chlorate, phosphate, monohydrogen phosphate, carbonate, sulfide, chromate, acetate, trichloroacetate, trifluoroacetate, butyrate, acrylate, methacrylate, crotonate, dodecanoate, stearate, cyclohexanoate, benzoate, toluate, benzenesulfonate, fluorobenzoate, benzenephosphinate, benzenearsinate, anthranilate, glycinate, etc. It may also be a complex anion such as tetrathiocyanatodiamminochromate or ferricyanide. Further, it may be the anion formed by a strong pi acid reducible to an anionradical, such as tetracyanoquinodimethane. The preferred anions are the monovalent inorganic anions and the monovalent organic anions containing from 1 to 12 carbon atoms.

This reaction takes place at temperatures as low as 0° C. or even lower. It can be accelerated by warming the aqueous solution but it is in general unnecessary to exceed a temperature of about 100° C.

The separation of the resulting ionic chelate is based on the solubility differences between it and the salt formed concomitantly. With proper selection of the cation and anion in the non-chelate reactant, a solubility differential will always exist. In the majority of cases, the salt formed is more soluble in water than the chelate formed, and the latter precipitates, if necessary after concentration of the solution. Less frequently, the salt will precipitate first, or may be caused to do so by addition of a water-miscible organic solvent such as methanol, ethanol or aceton. Selective solubility in an appropriate organic solvent may also be employed to effect or complete the separation.

This metathetical reaction can also be applied to chelates having anions other than Cl⁻ or Br⁻, after such chelates have been prepared as described above, so that it is possible, if desired, to exchange anions at will.

A variation of the anion-exchange reaction involves the use of the well-known ion-exchange resins. This procedure is valuable for the preparation of highly water-soluble chelates, and it can also be used to exchange anions other than Cl⁻ or Br⁻. For example, a solution of a chelate $T_2B^+X^-$ (T standing for tropolone) can be passed through a column containing the sulfonic, carboxylic or chloride form of an ion-exchange resin, with resultant anion exchange.

The ionic boron chelates of the tropolones are crystalline solids, often colorless though some (e.g., the bromides and iodides) are colored yellow to orange. They are characterized by extraordinary stability toward hydrolysis in neutral or acidic medium, although they are hydrolyzed by hydroxyl ions. No decomposition occurs when these compounds are treated with boiling water or boiling dilute acids, even on prolonged contact. This behavior is remarkable and unexpected since ionic chelates of boron with other ligands such as acetylacetone are known to be rapidly decomposed by water and atmospheric moisture.

The following examples illustrate the invention.

Example I

A solution of 5 g. (0.02 mole) of boron tribromide in 25 ml. of chloroform was added to a solution of 4.9 g. (0.04 mole) of tropolone in 120 ml. of chloroform. Heat was evolved and an oil separated. Nitrogen was bubbled through to remove the hydrogen bromide while the mixture was heated under reflux to the boiling point of the solvent for one hour. Upon evaporation to dryness the oil solidified to a pale yellow solid. The crude bis(tropolono)boron bromide was recrystallized from water to which sodium bromide had been added. The chelate salt was obtained as yellow needles which did not melt below 300° C.

*Analysis.*—Calcd. for $(C_7H_5O_2)_2B^+Br^-$: C, 50.5; H, 3.0; B, 3.3; Br, 24.0. Found: C, 48.4; H, 3.7; B, 3.1; Br, 24.0.

The ultraviolet spectrum of this chelate in water solution showed absorptions at 3350 A. ($\epsilon$=9900); 3100 A. ($\epsilon$=14,700); 2990 A. ($\epsilon$=17,740); 2430 A. ($\epsilon$=148,200); and 2390 A. ($\epsilon$=101,500).

The stability of bis(tropolono)boron bromide to acid hydrolysis was shown by heating a solution of the chelate in concentrated hydrochloric acid at 80° C. for 2 hours. The product remained unchanged, as shown by the fact that the solution contained no tropolone and that addition of potassium iodide to the solution yielded the characteristic yellow-organe bis(tropolono)broon iodide (see Example II). However, these chelates are hydrolyzed to tropolone under alkaline conditions, as shown by the fact that the ultraviolet spectrum of a fresh solution of bis(tropolono)boron bromide in 5% aqueous sodium hydroxide was identical to that of a solution, at equivalent concentration, of troplone in 5% sodium hydroxide.

Bis(tropolono)boron chloride was formed as described above for the bromide chelate, using boron trichloride bubbled through the solution. It was characterized by infrared analysis.

Example II

To an aqueous solution of bis(tropolono)boron bromide (prepared as in Example I but not recrystallized) was added a concentrated aqueous solution of sodium iodide. Yellow-orange crystals of bis(tropolono)boron iodide precipitated and were collected by filtration. Recrystallization from a hot methanol-acetonitrile mixture gave the chelate as orange flakes, M.P. 303° C.

*Analysis.*—Calcd. for $(C_7H_5O_2)_2B^+I^-$: C, 44.3; H, 2.6; B, 2.9; I, 33.5. Found: C, 44.3; H, 2.9; B, 3.0; I, 32.6.

Example III

Bis(tropolono)boron hexafluorophosphate was prepared by treating an aqueous solution of bis(tropolono)boron bromide with a saturated aqueous solution of ammonium hexafluorophosphate. The precipitated chelate was recrystallized from a hot water-methanol-acetonitrile mixture to give colorless needles, M.P. 218–222° C.

*Analysis.*—Calcd. for $(C_7H_5O_2)_2B^+PF_6^-$: C, 42.8; H, 3.8; B, 2.7; P, 7.8. Found: C, 43.1; H, 3.8; B, 2.7; P, 7.5.

Example IV

To an aqueous solution of bis(tropolono)boron bromide was added a concentrated aqueous solution of ammonium tetrathiocyanatodiamminochromate (Reinecke salt). A red precipitate of bis(tropolono)boron tetrathiocyanatodiamminochromate formed. After recrystallization from a hot water-acetonitrile mixture, the chelate was obtained as pink crystals, M.P. 169–172° C.

*Analysis.*—Calcd. for $$(C_7H_5O_2)_2B^+Cr^-(SCN)_4(NH_3)_2$$

C, 37.3; H, 2.8; B, 1.9; Cr, 9.1; S, 22.2. Found: C, 38.2; H, 3.0; B, 2.2; Cr, 8.9; S, 22.6.

In each of the following four examples, a saturated aqueous solution of bis(tropolono)boron bromide was treated with a saturated aqueous solution of the salt named. In each case, the corresponding chelate salt of the $(C_7H_5O_2)_2B^+$ cation and the named ion precipated and was separated by filtration. The chelates were characterized by their infrared spectra in each case.

Example V

From sodium tetraphenylborate, $NaB(C_6H_5)_4$, was obtained a cream-white chelate, M.P. 236–237° C.

Example VI

From lithium tetracyanoquinodimethanide,

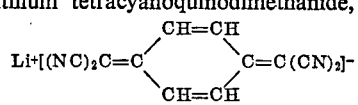

[see Acker et al., J. Am. Chem. Soc. 82, 6408 (1960)] was obtained a blue chelate, M.P. 208–209° C.

Example VII

From the sodium salt of 2,3-dichloro-5,6-dicyano-1,4-benzoquinone was obtained an orange-red chelate, M.P. 147–148° C.

Example VIII

From sodium picrate was obtained a yellow chelate, M.P. 202–203° C.

The foregoing examples are to be considered as illustrative rather than limitative, since the described procedures are broadly applicable to the preparation of ionic boron chelates from tropolones or substituted tropolones, in which chelates the anion is any desired one.

Additional examples of chelates obtainable by the described process are shown in the following list, in which the first column names the ligand-forming compound (in each case, the "tropolone" portion of the name refers, of course, to the basic structure 2-hydroxy-2,4,6-cycloheptatriene-1-one) and the second column gives the formula of the anion.

| Ligand-forming Compound | Anion |
| --- | --- |
| 4-Methyltropolone | $F^-$ |
| 3-Benzyl-5-nitrotropolone | $CN^-$ |
| 3-Naphthyltropolone | $ClC_6H_4COO^-$ |
| 3-Bromo-5-hydroxytropolone | $CF_3COO^-$ |
| 5-Iodotropolone | $PO_4^\equiv$ |
| 4-Methoxytropolone | $CH_3C_6H_4COO^-$ |
| 3-Nitro-7-phenyltropolone | $C_6H_5SO_3^-$ |
| 4-(n-Decyl)tropolone | $C_6H_5PO_3^=$ |
| 3-Bromo-5-chlorotropolone | $C_6H_5COO^-$ |
| 3-Bromo-5,7-dinitrotropolone | $CH_3(CH_2)_{10}COO^-$ |
| 4-Cyclohexyltropolone | $NO_3^-$ |
| 5-Hydroxy-4-methyltropolone | $HPO_4^=$ |
| 3-Hydroxymethyltropolone | $CCl_3COO^-$ |
| 3-(p-Tolyl)tropolone | $SO_4^=$ |
| 3,5,7-Trichlorotropolone | $CrO_4^=$ |
| 5-Butoxytropolone | $Cl^-$ |
| 4-Ethyltropolone | $CH_3(CH_2)_{10}COO^-$ |
| 4-tert.-Butyltropolone | $SO_3^=$ |
| 3-Hydroxytropolone | $C_6H_5AsO_3^=$ |
| 5-Ethoxytropolone | $CH_2=CH-COO^-$ |
| 3,7-Dibenzyltropolone | $CH_3COO^-$ |
| 4-Isopropyltropolone | $F-C_6H_4COO^-$ |
| 4-Methyl-5-nitrotropolone | $NO_2^-$ |
| 3-Phenyltropolone | $CO_3^=$ |
| 3,5,7-Tribromotropolone | $ClO_4^-$ |

The preferred products of this invention are those ionic chelates in which the anion is Cl⁻ or Br⁻, since they are obtained directly from the corresponding boron trihalide and serve as precursors for the other chelates.

The products of this invention are generically useful as test reagents for ink eradicators, by virtue of the fact that they give a color test when in contact with the oxidizing agents present in these materials. This property was shown as follows: Strips of paper were impregnated with dilute aqueous solutions of bis(tropolono)boron bromide and bis(tropolono)boron iodide, and allowed to dry. Upon touching the paper with representative ink removing materials, viz., dilute aqueous potassium permanganate, a commercial ink eradicator and dilute aqueous sodium hypochlorite, colored spots appeared at the points of contact (brown, dark yellow-brown and lighter yellow-brown, respectively). The other chelates of this invention give similar color tests. This property makes the products of this invention useful for the detection or prevention of forgery or alterations by erasure in such written document as bank checks, ledgers, wills, letters, notebooks and the like. Even those chelates which are colored can be used for this purpose since many business records such as checks or invoices are often themselves produced in color.

Additionally, the ionic chelates of this invention in which the anion is small and/or forms readily soluble salts, e.g., Cl⁻, Br⁻, are useful as scavengers or sequestering agents for large anions, such as $Fe(CN)_6^\equiv$, $AsF_6^-$, $SbF_6^-$, etc., since they remove such anions from solutions containing them through the described anion exchange reaction.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A boron chelate of the formula

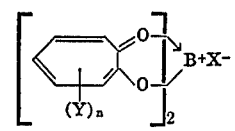

wherein X is an acid-forming anion, Y is a nuclear substituent selected from the group consisting of aliphatically saturated hydrocarbon radicals of 1 to 10 carbon atoms inclusive, lower alkoxy radicals, halo, hydroxymethyl, hydroxy and nitro and $n$ is a whole number from 0 to 3 inclusive.

2. A compound defined in claim 1 wherein X is an inorganic anion and $n$ is zero.

3. A compound defined in claim 1 wherein X is an organic anion of 1 to 12 carbon atoms inclusive and $n$ is zero.

4. A compound defined in claim 1 wherein X represents halide and $n$ is zero.

5. Bis(tropolono)boron bromide.

6. Bis(tropolono)boron hexafluorophosphate.

7. Bis(tropolono)boron iodide.

8. Process which comprises (I) bringing in contact and reacting, at a temperature in the range −20° C. to 100° C. and in an aprotic organic solvent, a boron trihalide $B(Hal.)_3$ wherein the halogen (Hal.) thereof is of atomic number 17 to 35 inclusive, with a compound of the formula

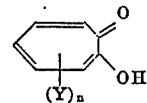

wherein Y is a nuclear substituent selected from the group consisting of aliphatically saturated hydrocarbon radicals of 1 to 10 carbon atoms inclusive, lower alkoxy radicals, halo, hydroxymethyl, hydroxy and nitro and $n$ is a whole number from 0 to 3 inclusive, and (II) recovering as the resultant product an ionic boron chelate of the formula

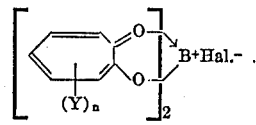

wherein Hal., Y and $n$ have the previously stated meanings.

9. The process defined defined in claim 8 wherein $n$ is zero.

10. Process which comprises (I) bringing in contact and reacting, in a preponderantly aqueous solvent, an ionic boron chelate of the formula

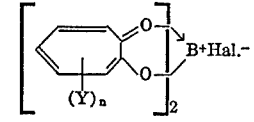

wherein Hal. is a halogen of atomic number 17 to 35 inclusive, Y is a nuclear substituent selected from the group consisting of aliphatically saturated hydrocarbon radicals of 1 to 10 carbon atoms inclusive, lower alkoxy radicals, halo, hydroxymethyl, hydroxy and nitro and $n$ is a whole number from 0 to 3 inclusive, with a salt of a strong base and an acid whose anion is other than Hal. defined above, and (II) recovering as the resultant product an ionic boron chelate of the aforementioned structure wherein Hal. has been replaced by the acid-forming anion of said salt.

11. Process which comprises (I) bringing in contact and reacting, in an aprotic organic solvent, a boron trihalide $B(Hal.)_3$ wherein the halogen (Hal.) thereof is of atomic number 17 to 35 inclusive, with a compound of the formula

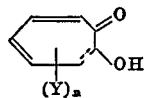

wherein Y is a nuclear substituent selected from the group consisting of aliphatically saturated hydrocarbon radicals of 1 to 10 carbon atoms inclusive, lower alkoxy radicals, halo, hydroxymethyl, hydroxy and nitro and $n$ is a whole number from 0 to 3 inclusive, (II) recovering the resultant bis(tropolono)boron chelate having the structure

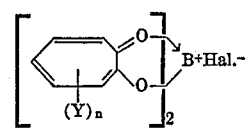

wherein Hal., Y and $n$ have the previously stated meanings, (III) bringing in contact and reacting, in a preponderantly aqueous solvent, said bis(tropolono)boron chelate with a salt of a strong base and an acid whose anion is other than Hal. defined above, and (IV) recovering as the resultant product a bis(tropolono)boron chelate of the aforementioned structure wherein Hal. has been replaced by the acid-forming anion of said salt.

No references cited.